United States Patent
Laraqui et al.

[11] Patent Number: 5,892,763
[45] Date of Patent: Apr. 6, 1999

[54] ARRANGEMENT FOR SUPPLYING LOCAL NETWORK EMULATION SERVICE OVER PUBLIC CONNECTIONLESS ATM-NETWORK

[75] Inventors: Kim Laraqui, Stockholm; Ala Nazari, Haninge, both of Sweden

[73] Assignee: Telia AB, Farsta, Sweden

[21] Appl. No.: 776,595
[22] PCT Filed: Jul. 5, 1995
[86] PCT No.: PCT/SE95/00828
    § 371 Date: Mar. 24, 1997
    § 102(e) Date: Mar. 24, 1997
[87] PCT Pub. No.: WO96/06492
    PCT Pub. Date: Feb. 29, 1996

[30] Foreign Application Priority Data
Aug. 18, 1994 [SE] Sweden ................ 9402749-7

[51] Int. Cl.[6] .......................................... H04J 3/02
[52] U.S. Cl. ................................. 370/395; 370/401
[58] Field of Search ........................ 370/389, 390, 370/392, 393, 395, 396, 397, 398, 399, 400, 401, 402, 403, 404, 405, 469, 471, 475

[56] References Cited

U.S. PATENT DOCUMENTS

| 5,444,702 | 8/1995 | Brunett et al. | 370/397 |
| 5,490,140 | 2/1996 | Abensour et al. | 370/397 |
| 5,526,351 | 6/1996 | Mochinaga et al. | 370/399 |

*Primary Examiner*—Huy D. Vu
*Attorney, Agent, or Firm*—Oblon, Spivak, McClelland, Maier & Neustadt, P.C.

[57] ABSTRACT

An arrangement for supplying local network emulation services over a broad connectionless ATM-network. The ATM-network is in charge of connectionless data communication traffic by a broadband data service network. Private local networks can be connected to the ATM-network to exchange traffic with other local networks. The ATM-network emulates local networks so that the ATM-network can deal with the local network traffic. The broadband data service network includes servers which function as address resolvers for local network addresses and as local network relays for routing local network traffic via the ATM-network. The server uses unit specific addresses and local emulation groups as addresses.

18 Claims, 4 Drawing Sheets

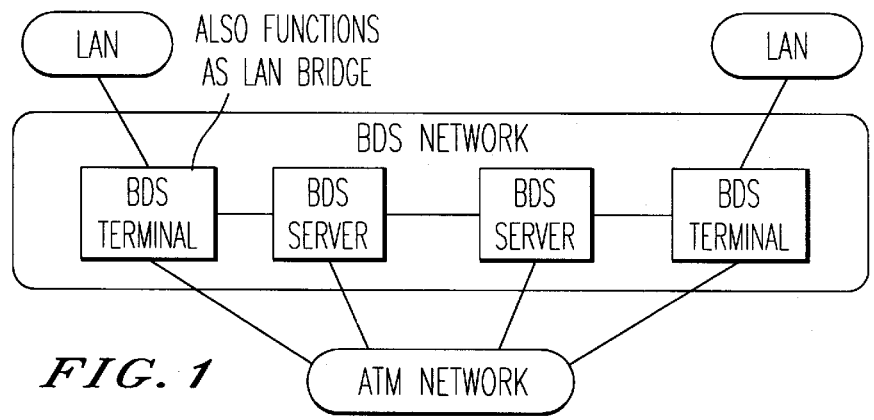
FIG. 1
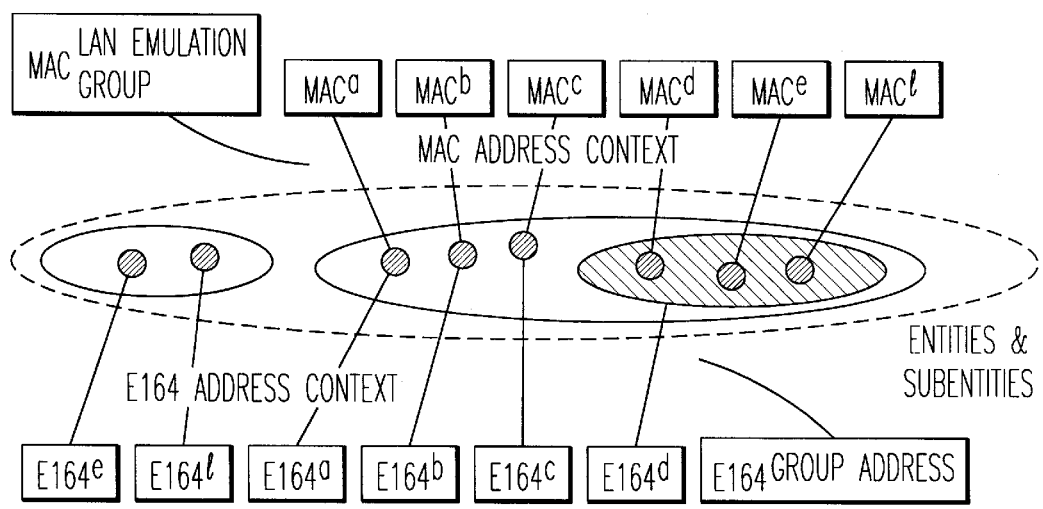
FIG. 2
| ISO 9542 ISH PDU (OCTETS) | |
|---|---|
| NETWORK LAYER PROTOCOL IDENTIFIER (130) | 1 |
| LENGTH INDICATOR | 2 |
| VERSION/PROTOCOL ID. EXTENSION | 3 |
| RESERVED (MUST BE ZERO) | 4 |
| TYPE (4 FOR ISH PDU) | 5 |
| HOLDING TIME | 6.7 |
| CHECKSUM | 8.9 |
| NETWORK ENTITY TITLE LENGTH INDICATOR (9) | 10 |
| NETWORK ENTITY (E164+SHORTHAND) | 11.19 |
| OPTIONS | 20.40 |
FIG. 9

ISO 9542 ESH PDU (OCTETS)

| Field | Octet |
|---|---|
| NETWORK LAYER PROTOCOL IDENTIFIER (130) | 1 |
| LENGTH INDICATOR | 2 |
| VERSION/PROTOCOL ID. EXTENSION | 3 |
| RESERVED (MUST BE ZERO) | 4 |
| TYPE (2 FOR ESH PDU) | 5 |
| HOLDING TIME | 6.7 |
| CHECKSUM | 8.9 |
| NUMBER OF SOURCE ADDRESSES (2) | 10 |
| SOURCE ADDRESS LENGTH INDICATOR (16) | 11 |
| SOURCE ADDRESS (MAC + LEG) | 12.27 |
| SOURCE ADDRESS LENGTH INDICATOR (10) | 28 |
| SOURCE ADDRESS (E164) | 29.38 |
| OPTIONS | 39.40 |

FIG. 8A

ISO 9542 RD PDU TO END SYSTEMS (OCTETS)

| Field | Octet |
|---|---|
| NETWORK LAYER PROTOCOL IDENTIFIER (130) | 1 |
| LENGTH INDICATOR | 2 |
| VERSION/PROTOCOL ID. EXTENSION | 3 |
| RESERVED (MUST BE ZERO) | 4 |
| TYPE (=6 FOR RD PDU) | 5 |
| HOLDING TIME | 6.7 |
| CHECKSUM | 8.9 |
| DESTINATION ADDRESS LENGTH INDICATOR (16) | 10 |
| DESTINATION ADDRESS (MAC + LEG) | 11.26 |
| SUBNETWORK ADDRESS LENGTH INDICATOR (8) | 27 |
| SUBNETWORK ADDRESS (E164) | 28.35 |
| NEIL (1) | 36 |
| NET (BDS SERVER ENTITY TITLE) | 37 |
| OPTIONS | 38.40 |

FIG. 8B

ARRANGEMENT FOR SUPPLYING LOCAL NETWORK EMULATION SERVICE OVER PUBLIC CONNECTIONLESS ATM-NETWORK

BACKGROUND OF THE INVENTION

1. Field of the Invention

ATM (Asynchronous Transfer Mode) networks supply connectionless data communication traffic by means of BDS (Broadband Data Service). Private local networks LAN (Local Area Networks) can be connected to the ATM network for exchanging traffic with other local networks. The present invention relates to a modification of ATM networks in order to emulate local networks so the ATM network in a simple way can manage the local network traffic, i.e. both public and private data communication services over ATM.

2. Discussion of the Background

According to previous technology one has been depending on the fact that local network traffic first is analyzed in certain nodes in the ATM network. This analysis is taking a lot of time as far as it results in an address solution, the result of which must be sent back to the customers in the local network, at which these themselves establish channels to addressees. Consequently the ATM network only functions as catalog for an address solution. A number of previous patent documents relate to this technology.

U.S. Pat. No. 5,280,481 relates to a method and a device for making use of for instance MAC-protocol (Media Access Control) for communication over an ISDN network (Integrated Services Digital Network). This is effected by the ISDN network emulating a local network by converting it by means of the method and the device. The MAC addresses are managed in the interface.

EP,A1 0 473 066 describes a system for interconnection of different local networks via an ATM network. The connection is performed by means of bridges which by means of internal tables decide the destination address and by means of VCI (Virtual Channel Identifier) transmits the frame, which is divided into cells, through the ATM network.

U.S. Pat. No. 5.088.090 shows a system for the interconnection of local networks by means of bridges. The bridges, which detect whether transparent routing or source routing is to be used, perform the connection on MAC-level.

EP, Al 0 511 144 relates to a method and a device for connection of local networks to a WAN (Wide Area Network). The connection is performed by means of a so called concentration node in the local network, which node is used for making a network node interface towards the local network, and an end node towards WAN with possibility of local addressing.

The mentioned documents present different ways of connecting traffic between local networks and other networks, for instance ATM. In all cases different ways of managing the local addresses are treated.

SUMMARY OF THE INVENTION

In contrast to the previously known technology the nodes which receive the local network traffic according to the invention act as both relays and address dissolvers. The address solution constitutes a side effect of the relay's operation. By this the system according to the invention can rapidly transmit local network traffic through the network, at the same time as it can tell the customers how they can chose alternative signaling routes over the ATM-network for future traffic.

BRIEF DESCRIPTION OF THE DRAWINGS

According to the present invention an arrangement for local network emulation service over public connectionless ATM data network is supplied. Local networks which want to communicate are connected to the ATM network. The ATM network makes use of BDS for data transmission, at which servers attend to switching functions for routing and connection of data traffic.

According to the present invention, servers function both as address dissolvers for local network addresses and local network relays for routing of the local network traffic.

The invention is presented in more details in enclosed patent claims.

SHORT DESCRIPTION OF THE FIGURES

Figure 3:
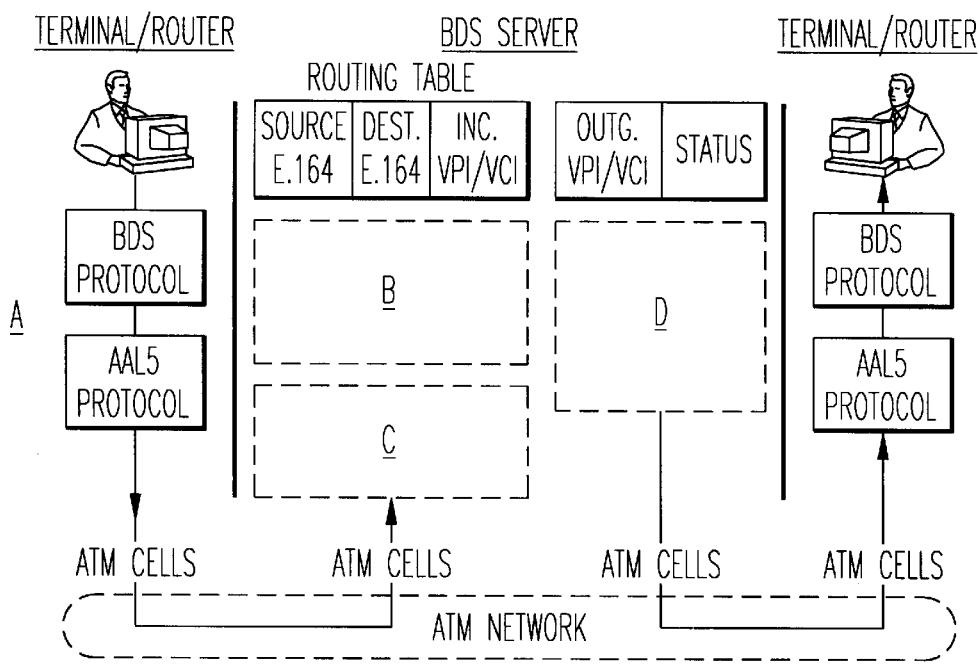
Figure 4:
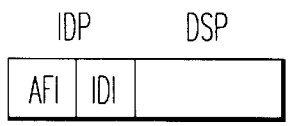
Figure 5:
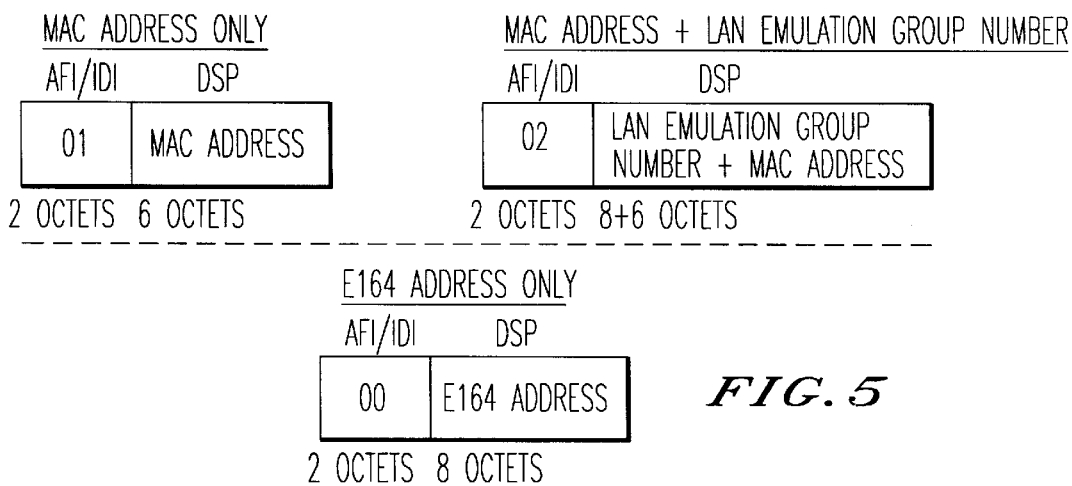
Figure 6:
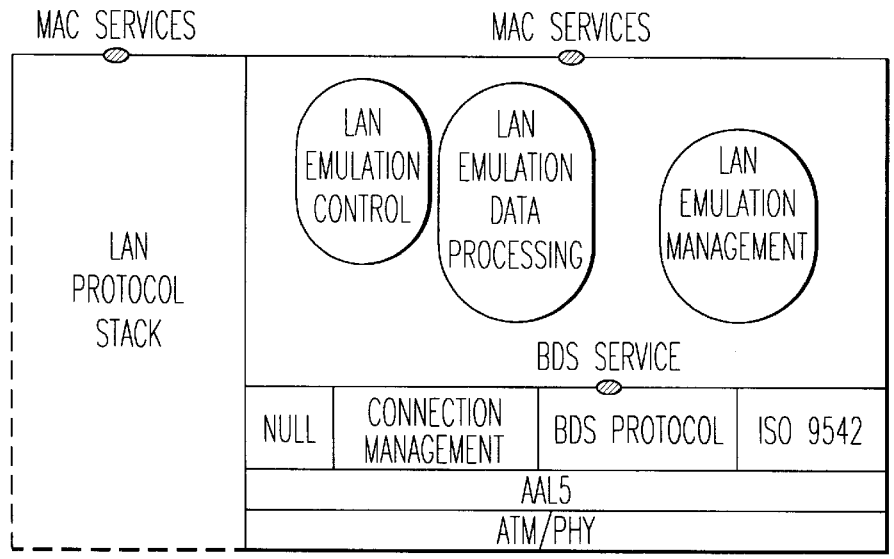
Figure 7:
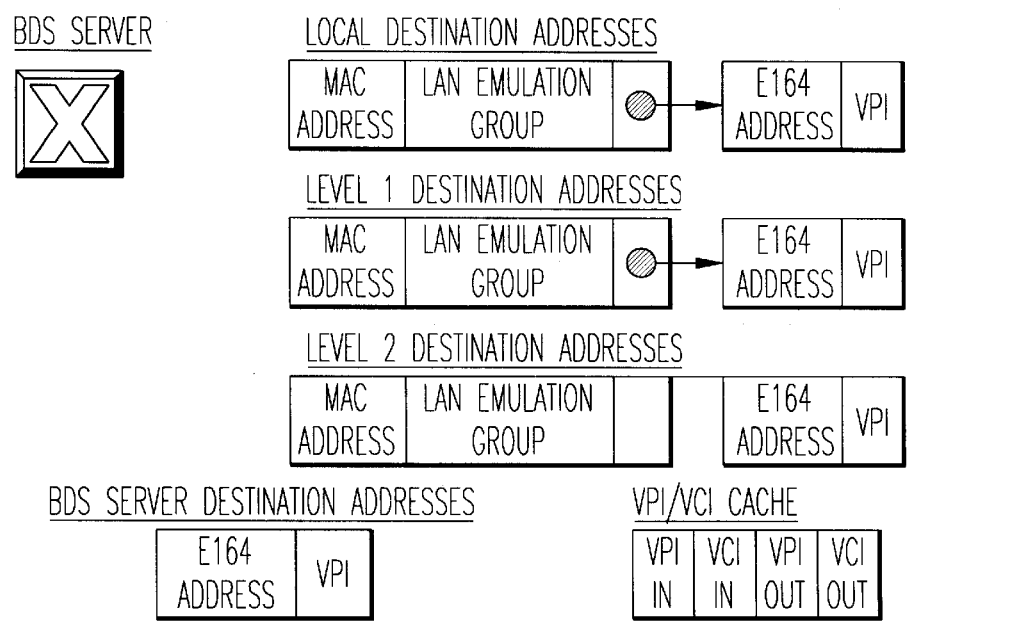

The invention will now be described in details with reference to the enclosed figures, where FIG. 1 schematically shows the construction of the networks, FIG. 2 presents the relation between local addresses and BDS addresses, FIG. 3 shows a routing table in BDS, FIG. 4 presents a standard address structure, FIG. 5 shows address structures for local network emulation according to the invention, FIG. 6 presents local network emulation layers, FIG. 7 shows local network emulation routing and data bases according to the invention, FIGS. 8 and 9 presents protocol data units according to the invention.

DETAILED DESCRIPTION OF A PREFERRED EMBODIMENT

FIG. 1 shows the connection of a local network to an ATM network via a BDS network. The BDS network comprises BDS servers and BDS terminals. The BDS terminals also act as bridges to local networks. The local networks are preferably private and use the ATM network for data communication with each other. The ATM network is also used for public traffic. The present invention relates to a modification of the ATM network and especially the function of the BDS servers for simplifying the addressing and communication between the local networks.

We will first have a look at the relations between the addressing structures in the local networks and in BDS. In local network surroundings MAC addresses (Media Access Control) are practically always used. These addresses have 48 bits and are uniquely associated to a respective unit, i.e. they do not reflect the network topology. Within the ATM network E164-addresses are used which have 64 bits and reflect the network topology, like telephone numbers.

FIG. 2 is a chart which presents the relation between the addressing system. We can make the following observations.

For local network emulation end stations there is a direct equivalence between MAC-addresses and E164-addresses (for instance $MAC^a$ to $E164^a$)

For local network emulation stations which emulate MAC-layer bridges there can be more MAC addresses which form a unit in the BDS system (for instance $MAC^d$, $MAC^e$ and $MAC^f$ corresponding to $E164^d$). This depends on the way the bridge wants to notify MAC addresses on the other side (for instance $MAC^e$ and $MAC^f$) for the local network emulation group.

MAC addresses may be regarded as pseudonyms for E164 addresses.

A local network emulation MAC address system indentifies a special local network emulation group, and it is possible that a MAC address exists in different local network emulation groups, i.e that the MAC addressing systems of local network groups are intersecting each other (this is not shown in FIG. 2).

Some units which are identified by the BDS system are not to be seen from the local network emulation system (for instance $E164^e$ and $E164^f$). These units can be either BDS terminals which do not supply local network emulation services, or BDS servers.

There may be more systems for each of the system types in FIG. 2. This is to a great extent dependent on how the name giving and addressing is organized and administered.

In the original BDS service, the routing was based on the combination <source-E164-address, destinations-E164-address> and the assumption that all BDS terminals used one and only one BDS process. According to the invention we now define the following for supporting the local network emulation service in BDS: We are using the original BDS routing table as is shown in FIG. 3.

We use the combination <MAC,LEG> as pseudonyms for E164 addresses. LEG (LAN Emulation Group) are symbolic numbers which are used for relating MAC- and E164 addresses to each other. An E164 address can have more pseudonyms, but a pseudonym can not exist for more than one E164 address. This means that a station equipped with more ATM interfaces should not register the same <MAC+LAG> on different interfaces, unless it is not accepted that they are interfering with each other's routing information in servers.

For making the server able to distinguish between <E164> and <MAC,LEG>, the address codings of the original BDS scheme must be modified. This can be performed by giving all addresses within the BDS system a tag specifying the used address system. The new coding is described later. By establishing <MAC,LAG> pseudonyms to the original <E164> routing databases, BDS can be used for implementing local network emulation services.

According to the invention the local network emulation service is supported over AAL5 (ATM Adaption Layer 5). It is then an advantage to modify the BDS network in a way that some ISO/OSI configuration managing protocols can be used.

Especially ISO9542 specifies a routing information exchange protocol between end systems (End Systems ES) and intermediate systems (Intermediate Systems IS) and ISO10589 specifies a similar information exchange among intermediate systems. In the standards service access points NSAP (Network Serviced Access Points) and points of attachments for subnetwork SNPA (Subnetwork Points of Attachments) are defined. In order to make it possible to use ISO9542 for routing and configuration managing of BDS over AAL5, the sublayers have been somewhat modified so the BDS protocol can be regarded as a layer 3c and AAL5 as a layer 3b. By that the selected ISO protocols can be used with very small or no changes.

In a subnetwork a catalog function must exist in the routers so that SNPA-points can be explicitly derived from NSAP addresses. In the BDS service we presume a subnetwork of completely connected BDS-servers. The only translating address solution needed is the one where new logical channels VCI (Virtual Channel Identifier) are collected for a new <source E164, destination E164>.

A consequence of establishing relations between <E164> and <MAC,LEG> is, accordingly, the possibility to route on the basis of the latter in the public domain (even if <MAC, LAG> in the public domain are regarded as NSAP addresses, as explained below). One might even state that MAC addresses are the only perfect NSAP addresses so far defined, because MAC addresses have no relation whatsoever to underlying routing mechanisms.

According to the standardized addressing principles the relation between NSAP and SNPA can be one-to-one, one-to a multiple, or a multiple to a multiple. This relation is explicitly decided by a network address catalog function in systems where such translations are relevant. In ISO8348 Addendum 2 network addressing is defined and specified in all details.

As is shown in FIG. 4 the NSAP address structure 1 5 consists of maximally 20 octets of two basic parts:
1. The initial domain part (IDP) and
2. The domain specific part (DSP)

The function of IDP is to specify a subdomain of the global network's addressing subdomain, and to identify the authority which is responsible for allocation of network addresses in this specified subdomain. IDP consists of two parts, AFI (Authority and Format Identifier) and IDI (Initial Domain Identifier).

In ISO8473 Addendum 2 is specified that the AFI values 00–09 are reserved and will not be assigned to specify a certain authority or format. AFI values starting with the FIG. 0 are intended for special cases, such as;

a change to another addressing scheme, a technology for optimizing NSAP address coding;

a way to indicate that a field which normally would have kept a whole NSAP address now keeps something less than a whole address, for instance a shortened form used for communication with a special subnetwork milieu.

ISO8473 Addendum 2 consequently only reserves the AFI values 00–09 and do not specify how they might be used. According to the invention the NSAP addresses are specified as shown in FIG. 5.

AFI=00 indicates a public connectionless data service user. The following two AFI values, 01 and 02, indicate alternative ways of using MAC addresses over the BDS network. For AFI=01 is only used <MAC>; AFI=02 gives an NSAP address <MAC,E164>.

At each intermediate system the server examines the local network emulation addresses to appoint next jump in the path to the goal end system and puts the SNPA address (VPI/VCI) for next intermediate system in the VPI/VCI-field of the server cells. In order to find the suitable logical path VPI (Virtual Path Identifier) is <MAC,LEG> used as a pseudonym for an E164 table, where this information is available. In the standard, address resolutions occur within the network address catalog function NADF (Network Address Directory Function) on the basis of both destination- and source addresses, as for the BDS-server.

The function of the E164 addresses from a configuration managing point of view is somewhat more complicated, because they in BDS are regarded as NSAP addresses, whereas they outside BDS should be defined as SNPA addresses. In the standard there are even a special NSAP address structure which is defined especially for managing E164 SNPA addresses. Since we in the BDS domain treat E164 addresses as NSAP addresses we can, hovewer, use the standardized routing and configuration managing technology. This does not prevent that units in higher layers regard this address as a basis for deriving any SNPA addresses.

The local network emulation layer at end stations and bridges equipped with ATM-interface is shown in FIG. 6. There are two possible ways of transferring data from MAC service interface. One is to use signalled logical channels SVC (Signalled Virtual Circuits), and the other is to use the BDS-service. For signalled logical channels a connection is established and data is tranferred by use of AAL5. For BDS no connection managing is required from the local network emulation layer's point of view, LAN emulation stations and end stations need to maintain the following configuration information, as is shown in FIG. 7.

1. Destination addresses, which are indexed with the combination <destination-MAC-address, destination - LAN-emulation group>. The E164 address is for signalled logical channels. If no channel is established, and the it communication accordingly occurs through the BDS server, normal-VPI is ="BDS".

2. Source-groups, which hold information about local network emulation groups at which the local network emulation station is registered. This information, the use of which is a local matter, is maintained by ESH protocol data units ESH PDU (End System Hallo Protocol Data Unit) from the server.

3. BDS server destination addresses, which consist of servers which are available for local network emulation over ATIM. The choice of server might be based on different service quality values QOS (Quality of Service) and might be defined as a part of the initial phase for logical local network stations which have signalling ability. The information about available servers are obtained outside the band (for instance by explicitly configuring host data bases at the stations).

In FIG. 7 are also shown BDS server databases, which take bi-directed, semi-permanent logical paths to local network emulation stations and to other servers. The databases are:

1. Local destination addresses, which are indexed by the combination <destination-MAC-address, local network emulation group>. The table contains routing information about local network emulation stations which are served by this server. Notice that it is not necessary that the logical channel identifiers VPI at this data base must be BDS if the server is implemented as a real overlaying BDS network, since the logical path should need to be over a logic channel switch/cross-connection.

2. Destination addresses level 1, which are indexed as the former. E164-addresses are to local network emulation stations and not to other BDS servers.

3. Destination addresses level 2, which are indexed by <local network emulation group>.

When a local network emulation end station is connected to a switch, it will register itself to its normal server by means of an ESH (End System Hello) protocol data unit PDU to this server. This ESH PDU is sent back to the transmitting local network emulation managing unit by a configuration message function (in accordance to ISO9542) at the server, which quite simply sends ESH PDU back to the specifically addressed MAC/E164 local network emulation end station.

ESH protocol data units are constructed as follow: The SAL indicator (Segment and Reassembly Layer) for this MAC-address must be 16, so the SA-field contains a combination <AFI/IDI=02+MAC-address, local network emulation group number> corresponding to the local network emulation end station. The original E164-address which indicates port- and switch identity at the virtual local network station and nothing else, is exclusively derived by the server by its knowledge from which local channel the ESH protocol data unit originated.

According to FIG. 8 we presuppose 8 octets for representing group numbers. This is in line with the E164 group number scheme. Name giving conventions for logical local networks might be in accordance with Internet, for instance A.B.C.D.E.F.G.H.

ESH protocol data units can be transferred in one out of two different ways, but always direct on AAL5 over reserved logical subchannels (VCI=9542).

The local network emulation managing unit constructs an ESH protocol data unit, which is sufficiently small for fitting on one single cell (inclusive AAL5 trailer). The available payload in a one cell AAL5 protocol data unit is 40 octets (53 -5 -CRC32-check length=40).

The local network emulation managing unit transmits it via AAL5-messages which are longer than one cell (for instance in the case with more source adresses/local network emulation groups).

The first method is preferred in order to minimize the processing in servers and should give a F-flow mechanism for the local network emulation service over BDS. This F-flow mechanism will now be called "F-LAN".

If the local network emulation end station represents a bridge, for instance to an Ethernet, it can also wish to register more MAC addresses on its E164-address, for instance for each new MAC-address which is registered by the bridge for the Ethernet side a new ESH protocol data unit shall be tranferred by the local network emulation layer configuration unit to the ATM-side, if the F-LAN-mechanism is used, otherwise a longer AAL5-packet can be used for the same purpose, but in an AAL5-piece.

As a result of the ESH protocol data unit the server registers the following information in its local database: <E164 MAC-address, local network group>. All database posts in servers which contain E164 address posts originating from local network emulation end stations are consequently equipped with references to emulated local networks to which they belong, as references to MAC addresses are associated with the E164 address. If a local network emulation station belongs to more than one virtual local network, it will be registered twice in the local routing database, because the registration is made per NAP, which is defined as a combination <MAC-address+local network emulation group>.

Each local network emulation end station reports continuously, with a frequency decided by a configuration clock in ISO9542-units, about its accessibility to the normal server.

Whenever a server registers a new post in its local database, it will issue a configuration message to other servers. This is also performed by means of an ESH protocol data unit as above, but with certain modifications.

The address resolution occurs as a side-effect according to the following. When resolution of a MAC-address to an E164-address occurs in servers, the server sends back a redirect protocol data unit RD PDU (Redict PDU) with the result to the initiating local network emulation end station. The redirect protocol data unit is shown in FIG. 8 with the following interpretation: "Destination address" is <MAC+ LEG>(alternatively only the MAC-address need to be specified, i.e. AFI/IDI=01) and "sub network address" is the E164-address which can be used for establishing a signalled logical subchannel. Notice that in this case the E164-address is used for deriving an SNPA-address by which the signalled logical subchannel is established.

Alternatively the local network station which receives the redirect protocol data unit can use the E164-address over the BDS-system, without local network emulation, i.e. by composing an NSAP-address <(AFI/IDI=00)+E164> out of the received SNPA E164-address.

For this redirect protocol data unit the additional selection field is set to the octet 1=100 0011 (QOS in accordance with ISO8473) and the octet 2=01 (source address specific QOS in accordance with ISO 8473) 00 0001 (MAC-address resolved).

The size of the redirect protocol data unit is 40, i.e. it fits in the F-LAN-mechanisms.

At jamming in the BDS-network the server issues, as a counteraction means, redirect protocol data units to the local network emulation end stations and strongly recommends that they establish signalled logical channels to goal local network emulation stations or groups of end stations (see FIG. 8). For this protocol data unit the additional selection field is set to octet 1 =1100 0011 as above, and the octet 2=0100 0010 ("Establish logical channel to E164").

At transmission of data the local network emulation unit has two choices: Either it will use a signalled logical subchannel to the goal local network end station, or, if no logical channel is found, it will use the BDS-service with its implicated VPI=BDS. The local network emulation end station can combine use of the BDS-service with the establishing of a signalled logical channnel parallelly.

Examples of Initiation, Registration, Address Solution, Connection Managing and Data Transmission Charging time and new registrations of MAC-addresses or local network emulation groups (ISO09542-protocol data units over AA15, with VPI=BDS, VCI=9542).

1. Station - - - $AAL5^{VCI=9542}$ ESH PDU $\{(MAC+LEG)^{NSAP}, E164^{NSAP}\} \rightarrow$ server. "I am here, please register my MAC-addresses and local network emulation groups".

This mechanism supposes that the server in some way can derive the E164-address from which the ESH protocol data unit originates.

2. Server - - - $AAL5^{VCI=9542}$ ESH PDU $\{(MAC+LEG)^{NSAP}, E164^{NSAP}\} \rightarrow$ station.

Configuration message, i.e. "it is OK, the server has registered you".

3. Server - - - $AAL5^{VCI=9543}$ ESH PDU $\{(MAC+LEG)^{NSAP}, E164^{NSAP}\} \rightarrow$ other servers.

Configuration message: "I route the following stations locally".

Notice that ESH which is sent back to other servers might be labelled $VCI^{9543}$ so the receivers are informed about that this information is intended for globally routing data bases. This server would yet be able to compile this information from the data base in FIG. 7, but this solution is more effective. It is the task of the server to decide whether this configuration information through $VCI^{9542}$ and $VCI^{9543}$ should be distributed to relevant local network emulation units or not. This can be regarded as something which shall be decided by configuration message functions of servers.

Continuity

1. Station - - - $AAL5^{VCI=9542}$ ESH PDU $\{(MAC+LEG)^{NSAP}\} \rightarrow$ server. "I am still here".
2. Server - - - $AAL5^{VCI=9542}$ ESH PDU $\{(MAC+LEG)^{NSAP}, E164^{NSAP}\} \rightarrow$ station. "You are still registered in the following groups" (of the local server).

Datatransmission

1. Station - - - BDS UNITDATA {source $(MAC+LEG)^{NSAP}$, destination $(MAC+LEG)^{NSAP}$, data QOS} $\rightarrow$ server.

Server: Address resolution (local, global based either on destination MAC or on LEG)+forwarding data.

2. Server - - - $AAL5^{VCI=9542}$ RD PDU $\{(MAC+LEG)^{NSAP}\}$, additional selection field octet nr 1=1100011, i.e. "QOS", octet nr 2=01 "source address specific QOS"+00 0001 "MAC-address resolved") $\rightarrow$ station.

"I have just resolved the destination MAC-address of the following E164-address. If you want to, use it to establish a signalled logical subchannel to this E164-address".

Notice that this message should be sent between servers and local terminals, not between servers. The server which transmits the message should adapt the redirect protocol data units to the data base of the local stations.

Contra pressure from the server to local units.

1. Server - - - $AAL5^{VCI=9542}$ RD PDU {(MAC+LEG+ E164}, additional field octet nr 1=1100011, octet nr 2=0100 0001 "Establish signalled logical subchannel to E164") $\rightarrow$ station.

"You had better start using a signalled logical subchannel for this E164-address".

This counter pressure mechanism can only be used locally by servers for routing stations.

ARP-mechnisms.

For polling servers the station transmits an empty BDS. The closest server transmits automatically a redirect protocol data unit to the station which produced the inquiry. This redirect protocol data unit of course contains information about the E164-address to the specified destination-MAC-address.

1. Station - - - BDS {Source$(MAC+LEG)^{NSAP}$, destination $(MAC+LEG)^{NSAP}$. No data} $\rightarrow$ server.
2. Server - - - $AAL5^{VCI=9542}$ RD PDU $\{(MAC+LEG)^{NSAP}\} \rightarrow$ station.

Configuration message "as a result of the inquiry".

The station which receives the message can store $(MAC+LEG)^{NSAP}$.

The enquiring mechanism above only applies to level 1.

The present invention accordingly offers the following advantages.

BDS is used as an underlying connectionless broad band data service.

The function of the local network emulation end stations is simplified.

The server is used as a data relay, as name resolver (MAC-addresses to E164-addresses) and as configuration manager for local network emulation services.

Within the BDS subnetwork MAC-addresses are treated as network addresses and MAC-addresses+local network emulation group numbers as NSAP-addresses.

The local network emulation group addressing will be as like the E164-addressing as is possible, so it will be easier to use them together.

Many of the already known configuration managing protocols, for instance ISO9542 and ISO10589 can be used for minimizing duplication of work and minimizing logical errors.

We claim:

1. Arrangement for supplying local network emulation service over public connectionless ATM-network comprising BDS-service for data transmission and local network LAN connected to the ATM-network, wherein BDS-servers are in charge of switching functions for routing and carrying traffic and act as address resolvers for local network addresses and as local network relays for routing of the local network traffic via the ATM-network, wherein the server forms particular local network addresses comprising unit specific addresses and local emulation group number as an address in the BDS-service, which local emulation group number relate the unit specific addresses and the ATM-addresses to each other, wherein the servers can use the local network addresses in parallel with the normal ATM-addresses.

2. Arrangement according to claim 1, wherein the local network addresses and the normal ATM-addresses are separated by a tag, by means of AFI-values in ISO8473 addendum 2.

3. Arrangement according to claim 2, wherein within the BDS-subnetwork it deals with MAC-addresses as network addresses and MAC-addresses+local network emulation group numbers as NSAP-addresses.

4. Arrangement according to claim 1, wherein standardized configuration protocols are used.

5. Arrangement according to any of the previous claims, characterized in that the servers are distributing addressing- and configuration information in the network at connection of local networks via a BDS-terminal.

6. Arrangement according to claim 2, wherein standardized configuration protocols are used.

7. Arrangement according to claim 3, wherein standardized configuration protocols are used.

8. Arrangement according to claim 2, wherein the servers are distributing addressing- and configuration information in the network at connection of local networks via a BDS-terminal.

9. Arrangement according to claim 3, wherein the servers are distributing addressing- and configuration information in the network at connection of local networks via a BDS-terminal.

10. Arrangement according to claim 4, wherein the servers are distributing addressing- and configuration information in the network at connection of local networks via a BDS-terminal.

11. Arrangement according to claim 6, wherein the servers are distributing addressing- and configuration information in the network at connection of local networks via a BDS-terminal.

12. Arrangement according to claim 7, wherein the servers are distributing addressing- and configuration information in the network at connection of local networks via a BDS-terminal.

13. Arrangement according to claim 4, wherein the standardized configuration is an ISO9542 standardized configuration.

14. Arrangement according to claim 4, wherein the standardized configuration is an ISO10589 standardized configuration.

15. Arrangement according to claim 6, wherein the standardized configuration is an ISO9542 standardized configuration.

16. Arrangement according to claim 6, wherein the standardized configuration is an ISO10589 standardized configuration.

17. Arrangement according to claim 7, wherein the standardized configuration is an ISO9542 standardized configuration.

18. Arrangement according to claim 7, wherein the standardized configuration is an ISO10589 standardized configuration.

* * * * *